May 31, 1938. A. O. HURXTHAL Re. 20,745

PROCESS OF DRYING LEATHER AND SIMILARLY TAUTLY STRETCHED UNITS

Original Filed Jan. 29, 1936 3 Sheets-Sheet 1

Inventor:-
Alpheus O. Hurxthal
by his Attorneys
Thomson & Thomson

PROCESS OF DRYING LEATHER AND SIMILARLY TAUTLY STRETCHED UNITS

Original Filed Jan. 29, 1936 3 Sheets-Sheet 2

Inventor:-
Alpheus O. Hurxthal
by his Attorneys
Howson & Howson

May 31, 1938. A. O. HURXTHAL Re. 20,745

PROCESS OF DRYING LEATHER AND SIMILARLY TAUTLY STRETCHED UNITS

Original Filed Jan. 29, 1936 3 Sheets-Sheet 3

Inventor:-
Alpheus O. Hurxthal
by his Attorneys
Howson & Howson

Reissued May 31, 1938

Re. 20,745

UNITED STATES PATENT OFFICE 20,745

PROCESS OF DRYING LEATHER AND SIMILARLY TAUTLY STRETCHED UNITS

Alpheus O. Hurxthal, Philadelphia, Pa., assignor to Proctor & Schwartz, Incorporated, Philadelphia, Pa., a corporation of Pennsylvania Original No. 2,109,425, dated February 22, 1938, Serial No. 61,392, January 29, 1936. Application for reissue March 25, 1938, Serial No. 198,160

1 Claim. (Cl. 34—24)

This invention relates to a new and improved method of drying animal hides, leather or corresponding units of other materials, particularly those of irregular sizes and contours, which are normally stretched on frames or boards individual to the units and wherein the units are secured to the drying and stretching frames by toggles or other devices which grip each unit at spaced intervals around its edge.

In the case of leather, i. e. pretanned animal hides of different kinds, it is customary while the hides are still in a wet condition to hang the hides or skins on poles or hooks in dry lofts or to stretch each unit on a frame comprising a wire mesh screen or perforated sheet capable of receiving the hooks of the toggles which are clamped to the edges of the unit to draw, stretch and hold the unit tightly and evenly over and throughout its entire area.

The loaded frames are usually inserted into a drier in relatively close laterally spaced parallel relation to each other. Drying is effected by air blowing from one side or end of the drying chamber across and between the plurality of frames, with the air moving in the direction of the plane of each frame and across the unit carried thereby from one edge thereof toward the other edge thereof.

Under the above noted process or system, that edge of the unit nearest the source of the drying air, and with which the air contacts first, begins to dry before any other portion of the unit and this uneven drying progresses across the unit in accordance with the direction in which the air travels. Consequently, that edge of the unit which lies furthest away from the source of the drying air dries last and before this edge is completely dry the opposite edge, that is, the edge nearest the source of drying air has become overdried resulting in that edge and the adjacent portion of the unit becoming harsh while the last dried portion, which is dried to the proper extent, is relatively soft and pliable.

The progressive drying of the unit from one side toward the opposite side thereof, in addition to the above, is responsible for detrimental strains being set up in the unit itself. As the unit dries it shrinks and where the drying is progressive from one side to the other the shrinking likewise follows from one side to the other, thus creating undesirable strains, under which the unit is placed by such uneven shrinkage, and which frequently causes the leather to pull loose from the toggles with a resultant damage to the leather at and adjacent the edges of the unit.

Subsequent to the above noted drying of the skins the skins are put through an operation commonly called "sammying". This operation merely consists of dampening the hides or skins with water and laying them away in a pile with or without sawdust between the hides to permit the moisture to soak through and mellow the skins or hides.

Subsequent to the "sammying" operation the skins or hides are put through another operation commonly referred to as "staking". This operation merely consists in the pulling out of the leather between an iron anvil and an agate roller. During this operation the skins are in a very moist condition and are again stretched on frames and dried in the manner above noted after the staking operation has been completed.

After skins have been dried subsequent to the staking operation the skins are put through what is commonly known as a "seasoning" operation which is simply a surface finishing and during which there is a very small amount of moisture in the skins.

After seasoning the hides are hung on poles or hooks prior to being brushed and trimmed ready for market and during which time the slight amount of moisture present during the seasoning operation is evaporated by natural or artificial means.

The present invention is intended for use in the drying of the hides at any stage in the operation prior to the "seasoning" in which the hides contain a relatively great amount of moisture requiring a considerable length of time for its removal from the hides prior to the hides being subjected to the next step of the processing of the hides and in which the hides are subject to the detrimental drying strains noted above.

The object of the present invention is to cause the drying air to impinge upon all parts of the unit simultaneously, in a direction substantially perpendicular to the plane of the unit, whereby even and uniform drying and shrinking of the unit is accomplished at all points throughout its entire area at the same time.

Under the method forming the subject matter of the present invention the unit dries in approximately one-third the time required for drying the same units under the old method above described.

In the drying of leather and similar units, one of the greatest handicaps of the industry has been the expense involved in the provision of sufficient numbers of frames and toggles. Under the method forming the subject of the present invention, and wherein the drying time is reduced to substantially one-third of the drying time required under the old method, it naturally follows that each frame and its complement of toggles is available for use three times as often as under the old method. Consequently, only one-third of the number of frames and toggles will be required for drying a predetermined number of units or three times as many units may be dried in the same time and with the same equipment as was formerly required for the drying of the lesser number of units.

Under the old system in order to lessen the unequal drying of the units and the detrimental effects thereof it was necessary to employ some form of humidifying apparatus in the drier for retaining or supplying moisture to the air in circulation. This condition lengthened the time necessary to dry the units, whereas under the system or process forming the subject of the present invention it is possible to extract the moisture from the air in circulation and to impinge the dry air against the units, thus materially reducing the time necessary for the drying of each unit and at the same time eliminating the detrimental effects of the strains normally set up by the unequal drying and shrinking under the old method.

The drying of leather or other units in accordance with the principles of the present invention may be readily carried on in an apparatus such as that disclosed in the accompanying drawings, of which:

Figure 1:
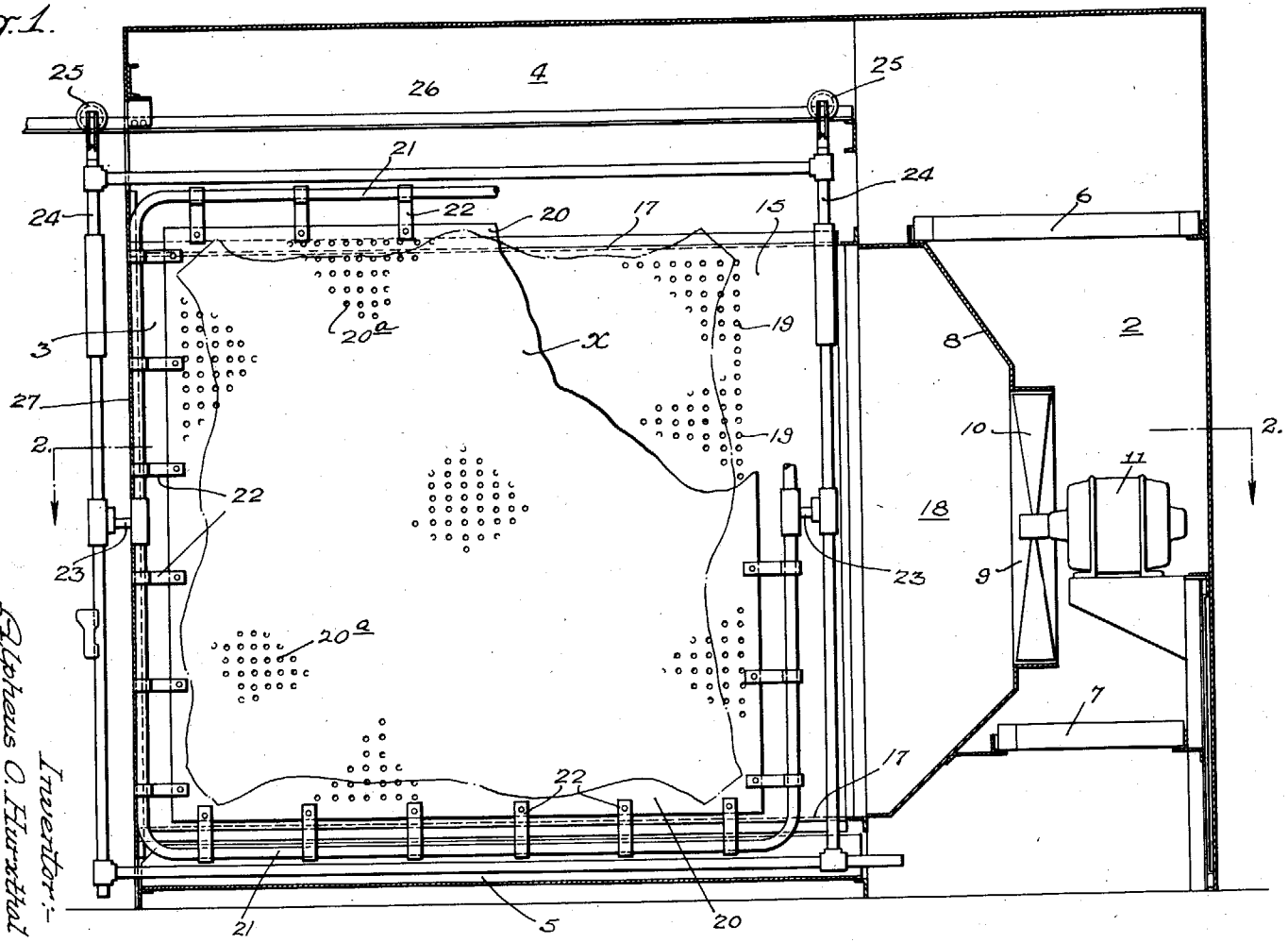
Fig. 1 is a vertical longitudinal section of the drier.

As shown in the drawings, the apparatus comprises an outer casing 1 enclosing an air conditioning chamber 2 at one end, a drying chamber 3 at the opposite end, a circulating chamber 4 above the chambers 2 and 3 and extending longitudinally of the drier and a lower circulating chamber 5 extending longitudinally of the casing beneath the chambers 2 and 3.

The circulating chambers 4 and 5 communicate at one end with the air conditioning chamber 2, through heating or cooling units 6 and 7 by which the air in circulation may be heated or cooled or the entrained moisture removed.

The air conditioning chamber 2 and drying chamber 3 are separated by a suitable partition 8 in which is formed a circular opening 9. An air impeller in the form of a fan 10 in the present instance is rotatably mounted in the opening 9 and rotated in any suitable manner; for example, by an electric motor 11 mounted in the air chamber 2.

The chamber 3 is provided with a plurality of vertical partitions 15 which are of a foraminous nature throughout and which divide the chamber into frame receiving compartments 16, 16, in which the units of material to be dried are placed, and intermediate channels 17 which communicate at one end with an air space 18 formed at the one end of the drying chamber 3. The interiors of the compartments 16 communicate at their tops and bottoms respectively with the upper and lower circulating chambers 4 and 5. The vertical partitions 15 as illustrated in the drawings are provided with perforations 19 over their entire areas.

The leather or other units $x$ are stretched tautly on suitable drying frames which each include in the present instance a perforated plate 20 having openings 20$a$ over its entire surface for receiving the hooks of the toggles (not shown) which, as is well known in the art, grip the leather or other unit at desired points around the edges of the unit and support the unit in laterally spaced substantially parallel relation to the perforated plate 20.

Each plate 20, is hung within a frame 21 by suitable straps 22, and each frame 21 in turn is pivoted at its opposite sides, as illustrated at 23, 23, within a supporting frame 24. Each supporting frame 24 is provided with wheels 25 arranged to run on overhead tracks 26 mounted in the upper chamber 4 of the casing 1.

Each of the frames 21 is provided with an end plate 27, said end plates combining with vertical plates 28, 28 at the receiving end of the drier to form an end wall on the drier when the drying frames are in position within the drier.

Figure 2:
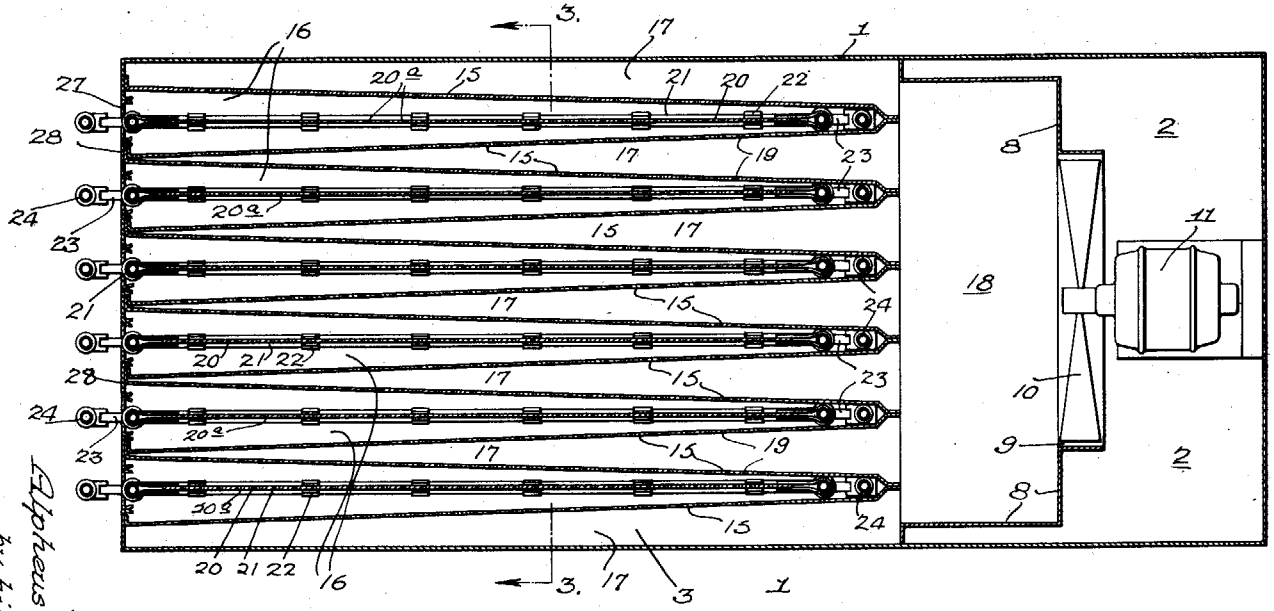
Fig. 2 is a sectional plan view taken on the line 2—2, Fig. 1.
Figure 3:
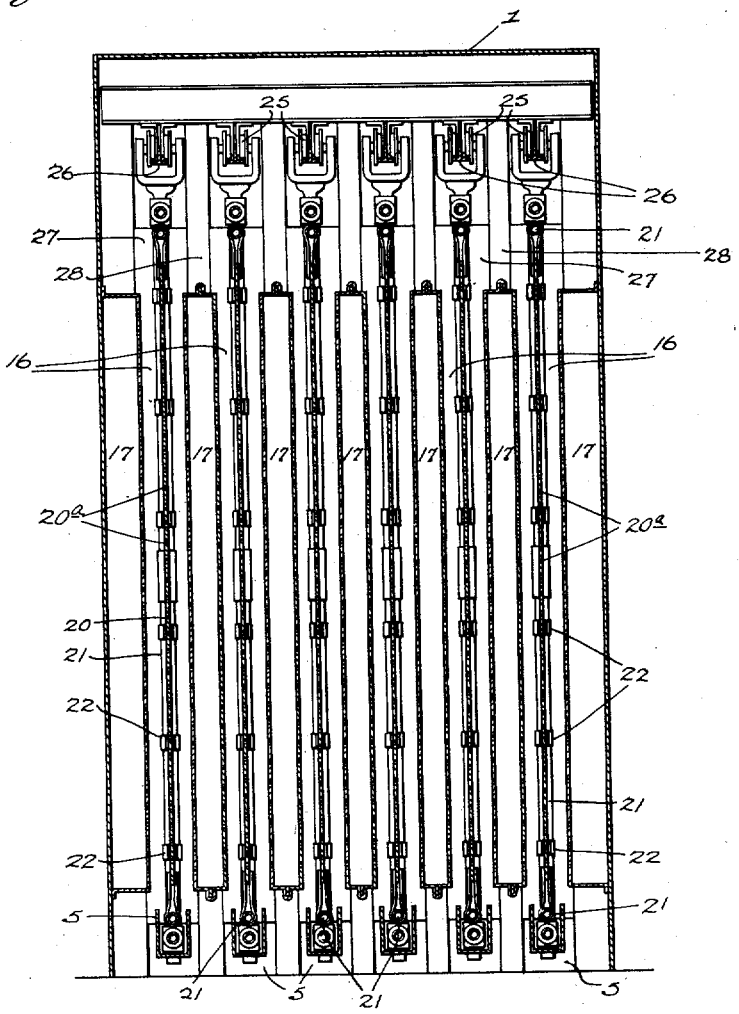
Fig. 3 is a vertical transverse section taken on the line 3—3, Fig. 2.

As shown in Fig. 2, the partitions 15, 15 are spaced apart adjacent the air space 18 to form the mouths of the channels 17 and converge toward the opposite end of the drier to progressively reduce the width of each channel 17. At the last said end of the drier each converging pair of partitions 15 are joined together and to one of the end plates 28.

With the fan 10 in operation, the air is moved or drawn out of the end compartment 2 and propelled into the air space 18, at the one end of the chamber 3, and moves longitudinally of the drier from the air space 18 into the wide ends of the channels 17. The converging relation of the perforated partitions 15 traps the longitudinally flowing air and causes it to move out of the channels 17 substantially at right angles thereto and perpendicular to the partitions 15, entering the compartments 16 from opposite sides thereof and impinging upon the exposed surface of the unit $x$ carried by each of the plates 20 within each compartment 16.

In some instances, there may be a unit $x$ mounted on each side of each plate 20. However, whether there is a unit on but one side or a unit on each side of each plate, the air passing from the channels 17 into the compartment 16 will impinge upon the one or both units $x$ at all points over the entire area thereof and substantially at right angles to the plane thereof, whereby uniform drying at all points throughout the area of each unit occurs simultaneously.

The air after impinging upon the units $x$ passes upwardly and downwardly into the upper and lower compartments 4 and 5 and returns to the chamber 2 through the conditioning apparatuses 6 and 7, as previously noted, for a repeat of the cycle.

While the drawings show a large number of relatively small holes 19 in each of the walls 15 for simultaneously projecting a large number of jets of air against the surface of the unit being dried, it is within the scope of the present invention to use a smaller number of larger holes distributed over the area of the unit or a single large hole at the center of the surface of the unit to project the air against the unit substantially at the center thereof or at a number of points about the center of the unit to cause the air to move from the jet or jets in contact with the surface of the unit toward the marginal edges thereof and whereby a uniform drying of the unit may be accomplished. However, the large number of small jets is preferable.

I claim:

The method of drying wet tanned hides prior to seasoning or other finishing treatment which consists in stretching a hide in all directions outwardly from the central area thereof toward the marginal edges of the hide, securing the edges of the stretched hide to a suitable support to resist subsequent shrinkage of the hide, and impinging jets of drying air against the surface of the hide at relatively closely spaced points simultaneously over substantially the entire area of said surface to effect uniform drying of the hide at substantially all points over the entire area of said surface simultaneously.

ALPHEUS O. HURXTHAL.